(12) United States Patent
Mikkelsen et al.

(10) Patent No.: US 7,463,440 B2
(45) Date of Patent: Dec. 9, 2008

(54) SYSTEM FOR IMPROVING PERFORMANCE WRITING STREAMING TAPES

(75) Inventors: Hans C. Mikkelsen, Afton, MN (US); Stephen H. Anderson, Roseville, MN (US); Timothy T. Cain, Vadnais Heights, MN (US); David W. Dorumsgaard, New Brighton, MN (US); Glenn C. Kaiser, Blaine, MN (US); Haeng D. Park, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 410 days.

(21) Appl. No.: 10/970,801

(22) Filed: Oct. 21, 2004

(65) Prior Publication Data

US 2005/0128624 A1    Jun. 16, 2005

Related U.S. Application Data

(62) Division of application No. 09/968,295, filed on Oct. 1, 2001, now Pat. No. 6,870,699.

(51) Int. Cl.
*G11B 5/02* (2006.01)
*G11B 5/09* (2006.01)
*G06F 7/00* (2006.01)
*G06F 17/00* (2006.01)

(52) U.S. Cl. .............................. 360/55; 360/48; 707/102
(58) Field of Classification Search ....................... None
See application file for complete search history.

(56) References Cited

U.S. PATENT DOCUMENTS

| | | | | |
|---|---|---|---|---|
| 4,393,445 A | * | 7/1983 | Milligan et al. | 360/72.2 |
| 4,428,064 A | * | 1/1984 | Hempy et al. | 711/113 |
| 5,525,902 A | * | 6/1996 | Nakajima et al. | 324/212 |
| 6,049,848 A | * | 4/2000 | Yates et al. | 711/4 |
| 6,711,580 B2 | * | 3/2004 | Dahman et al. | 707/102 |

FOREIGN PATENT DOCUMENTS

EP    0913760 A1 * 6/1999

OTHER PUBLICATIONS

American National Standards Institute, Inc. "For Information Systems—File Structure and Labeling of Magnetic Tapes for Information Interchange" ANSI X3.27-1987.*

* cited by examiner

*Primary Examiner*—Joseph Feild
*Assistant Examiner*—Daniell L Negrón
(74) *Attorney, Agent, or Firm*—Charles A. Johnson; Robert Marley; Hollingsworth & Funk LLC

(57) ABSTRACT

A method for efficiently saving data to tape, preferably within the ANSI X3.27 standard format sends signals to the tape drive to allow the tape drive to buffer the required tape marks, which the standard requires. Although the standard presumed these would be required for synchronization and would be written when produced, we do not adhere to that thinking. Instead we synchronize only at the logical end of the application constructed file, or at the end of the tape in one embodiment, saving time in writing through avoiding stop-start activities of the tape drive, thus allowing newer tape drives to take advantage of the features of the ANSI X3.27 standard. We also provide an embodiment, which allows for non-ANSI standard (i.e., unlabeled) tapes to be used.

20 Claims, 5 Drawing Sheets

(File Segment Sequence)

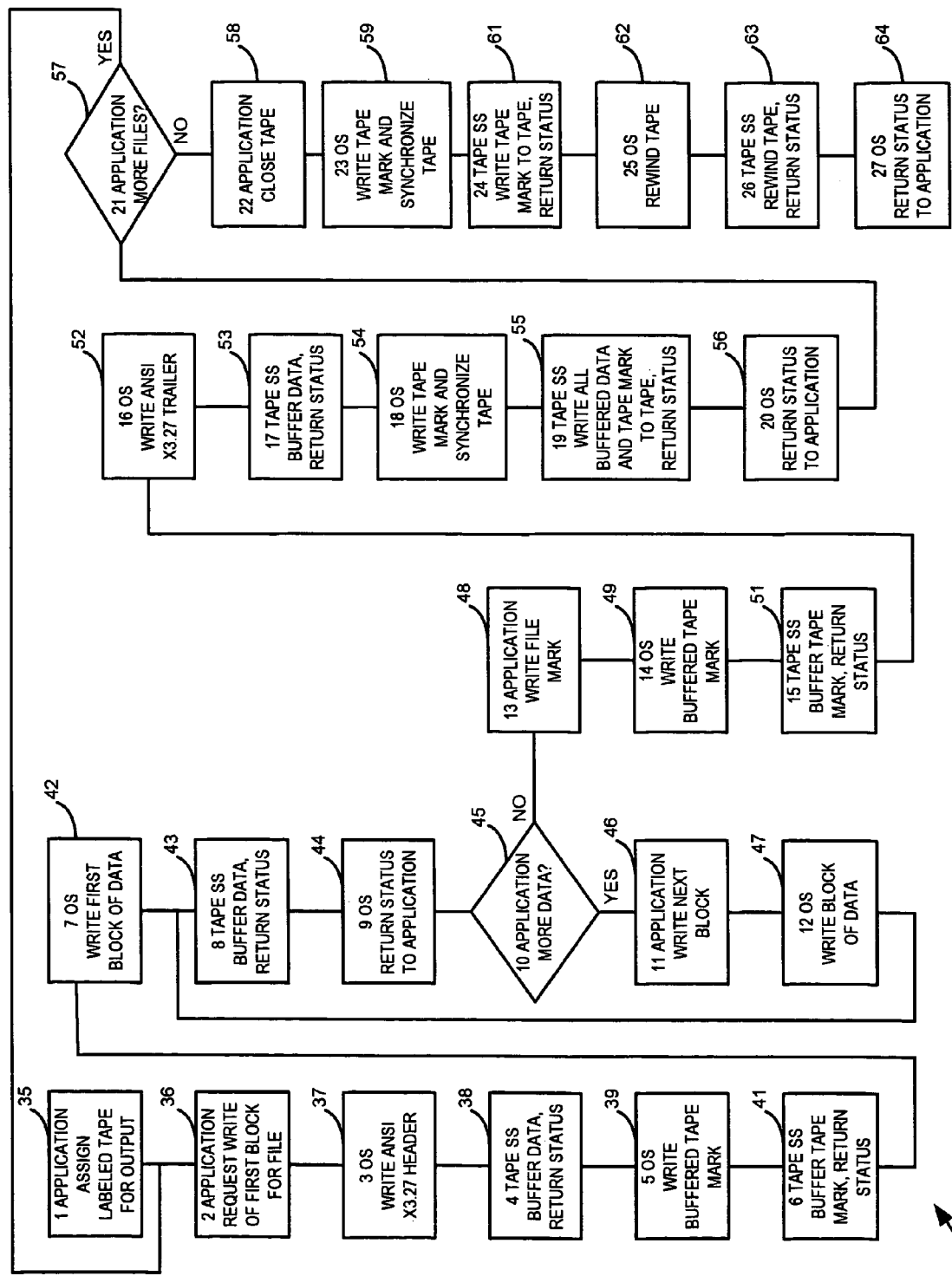
FIG. 4 (Synchronize Once per Logical File)

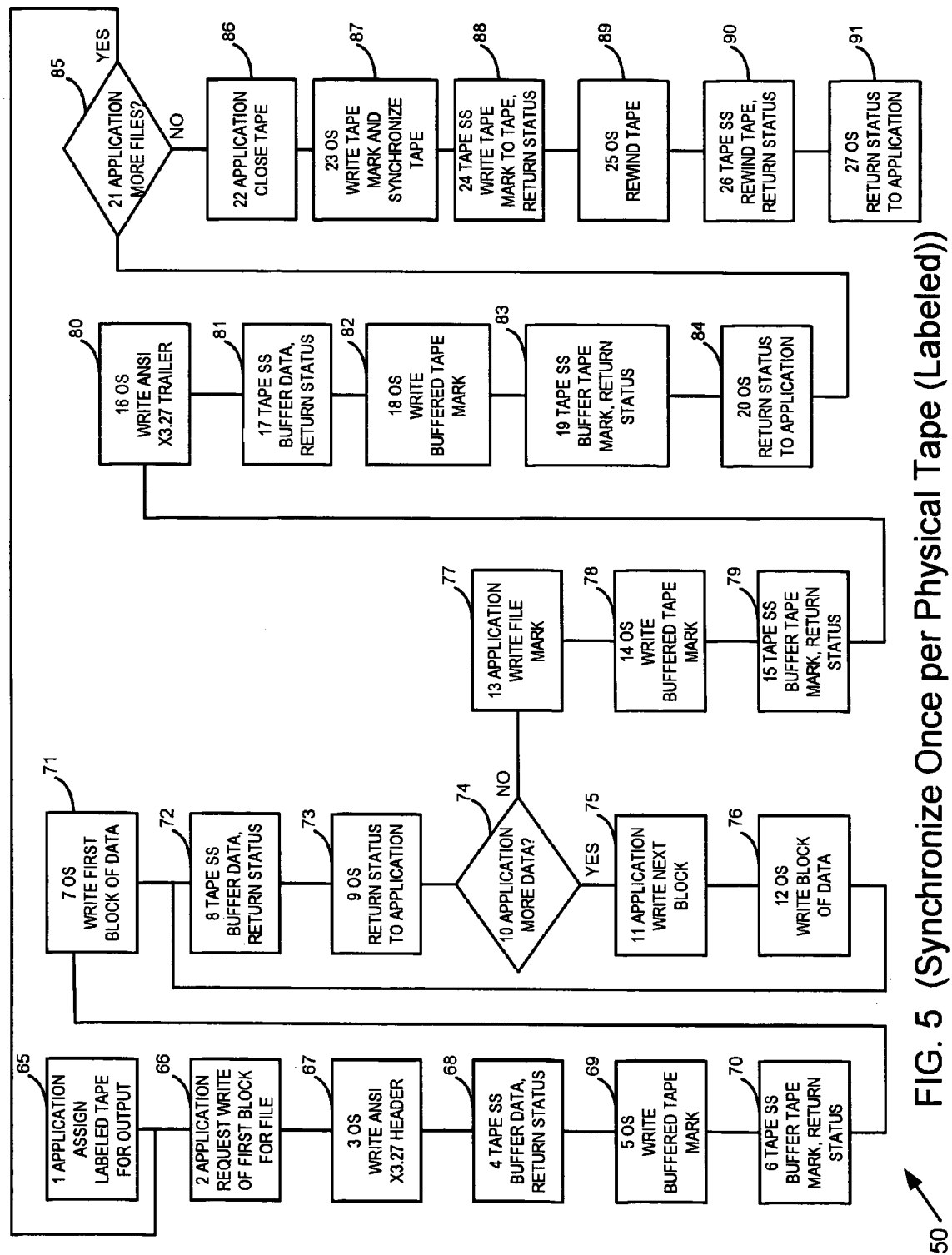
FIG. 5 (Synchronize Once per Physical Tape (Labeled))

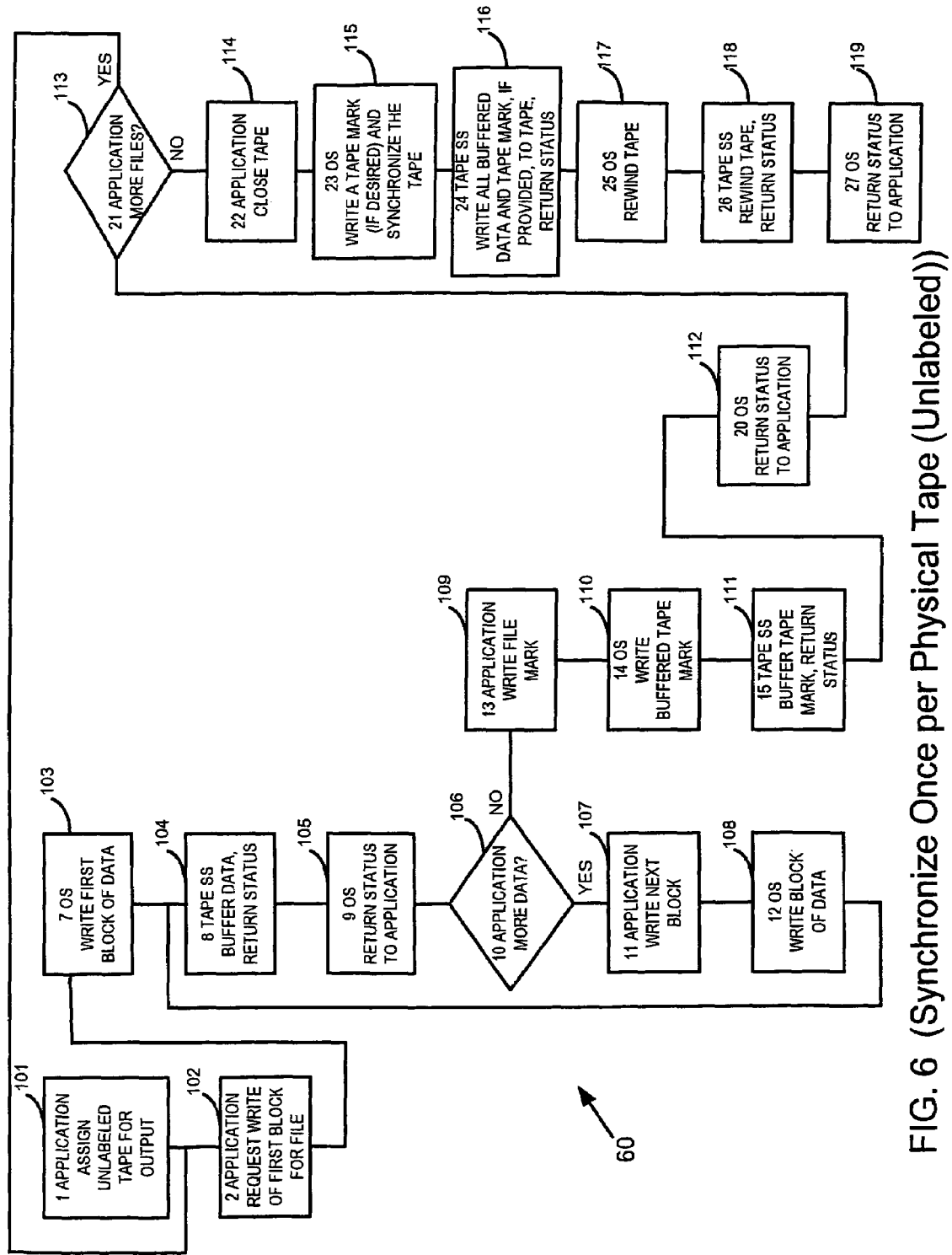
FIG. 6 (Synchronize Once per Physical Tape (Unlabeled))

SYSTEM FOR IMPROVING PERFORMANCE WRITING STREAMING TAPES

RELATED APPLICATIONS

This application is a divisional of U.S. Ser. No. 09/968,295, filed Oct. 1, 2001, now U.S. Pat. No. 6,870,699.

BACKGROUND OF THE INVENTION

1. Field of the Invention

This invention relates to improving performance in the writing of data to streaming tapes and has particular use in the application of ANSI X3.27 labeled data tapes.

2. Background Information

Tape drives remain a significant component for storing data in large computer centers and in some small ones as well. One of the common standards that allows tapes to be transferred among various computer systems is the ANSI standard X3.27, which specifies certain format configurations and protocol in dealing with writing and reading to and from tapes. However, this standard was developed at a time when tape drives had data transfer rates that were slower, and start stop rates that were faster, and so it made sense to put synchronizing tape marks at a header, at the end of the data file an application was writing, and again at the end of a trailer that the ANSI standard requires to be written after the end of the data file.

Along with the changes in the drive technology, the technology for reading tapes considerably faster has developed. Therefore, tape marks, which were originally just large blank spaces, are now full of data useful to the tape drive, usually specific to the tape drive type.

It takes a significant amount of time to reposition (i.e., stop and start) modern streaming tape. (Current technology has reposition times of 440 milliseconds while older technology had reposition times of 90 milliseconds.) ANSI X3.27 defines tape labeling standards, which requires the writing of 3 tape marks per logical file. Writing tape marks is normally a synchronizing operation (that is, the data in the buffers is flushed to the tape along with the tape mark). Since the tape subsystem has no more data to write to the tape, tape motion is stopped and repositioning must occur.

If an application writes a large number of logical files to a streaming tape, it can take longer to write the modern tape which has a faster transfer rate than it does to write old technology tapes with a considerably slower transfer rate. For example, an older tape technology (technology 1) had a data transfer rate of 3 megabytes per second and a repositioning time of 90 milliseconds. It takes about 1.27 seconds to write one 3 megabyte file to this tape in ANSI X3.27 format. A more recent tape technology (technology 2) but still not the most recent technology had a transfer rate of 16 megabytes and a repositioning time of about 280 milliseconds. It would take this tape technology about 0.86 seconds to write a 3 megabyte file in ANSI X3.27 format. For the modern tape technology (technology 3) that has a data transfer rate of 16 megabytes per second and a repositioning time of 440 milliseconds, it takes 1.50 seconds to write the same 3 megabytes of data. As can be seen from these numbers, technology 3 will perform better than the technology 1 with a transfer rate of 3 megabytes per second once the file size is larger that about 4 megabytes. However, since the technology 2 has the same transfer rate as the technology 3 but faster repositioning times, technology 3 will never have better performance than technology 2. Because of the large capacity of the tapes for technology 3, the 0.48 seconds per file becomes significant when there are a large number of files on the tape (1000 files is about 8 minutes which is significant in the computing world).

Thus a clear need for improvement in tape writing when using the ANSI X3.27 standard can be seen. One form of this invention reduces the number of stop/start times by 66.7% for labeled tapes, which would improve the technology 3 time for the example 3 megabyte file to 0.458 seconds.

A number of things have contributed to the current performance problem using the ANSI x3.27 standard. Tape data transfer rates are faster. The tape moves at a faster rate. Tape is thinner. All of these characteristics combine to make the stop/start times of modern tape subsystems longer than for previous tape subsystems. Although the problem existed in the past, it was not as significant. Therefore, synchronizing file marks were always used even though some tape subsystems such as those supporting the SCSI protocols were capable of supporting buffered tape marks. (By buffered tape marks, we mean marks that are put into buffers instead of being written immediately to tape.)

The problem is most acute for ANSI X3.27 labeled tapes since there are 3 times as many file marks on these tapes as there are on tapes that do not use ANSI X3.27 standards.

Many systems do not support this standard and, therefore, do not have the problem we have described. But tapes without ANSI X3.27 labels have limited protection against being mounted as the wrong reel, particularly in a multi-vendor site. There are several versions of X3.27, some of which provide for high security identification codes to be written on them. Tapes without such high security versions of the labels can also provide less security because of the requirement under the X3.27 standard that the user of the tape identify itself to the operating system before the operating system will allow the tape drive to read the tape.

Some systems that do not support the ANSI X3.27 standards go even a step further and do not use write file mark commands at all but write a special end-of-file data block. This eliminates all stop/start caused by writing file marks. Again, tapes written without ANSI X3.27 labels have limited protection against being mounted as the wrong reel particularly in a multi-vendor site. In addition, tapes with an end-of-file data block can generally not be used for data exchange with other host types because the other hosts will not recognize the end-of-file data block as an end-of-file mark. So this is not a good solution where data exchange is desired.

Accordingly, we describe our inventive solution to these problems below, the drawings and the description to be taken as instructive but not limiting.

BRIEF DESCRIPTION OF THE DRAWINGS

FIG. 4 is a flow diagram illustrating the process of writing tape data in accord with a preferred embodiment of the invention that uses a single synchronizing tape mark per application file in accord with the ANSI X3.27 standard.

FIG. 5 is a flow diagram illustrating the process of writing tape data in accord with a preferred embodiment of the invention that uses a single synchronizing tape mark per tape in accord with the ANSI X3.27 standard.

FIG. 6 is a flow diagram illustrating the process of writing tape data for an unlabeled tape that synchronizes once per tape.

SUMMARY OF THE INVENTION

Figure 1:
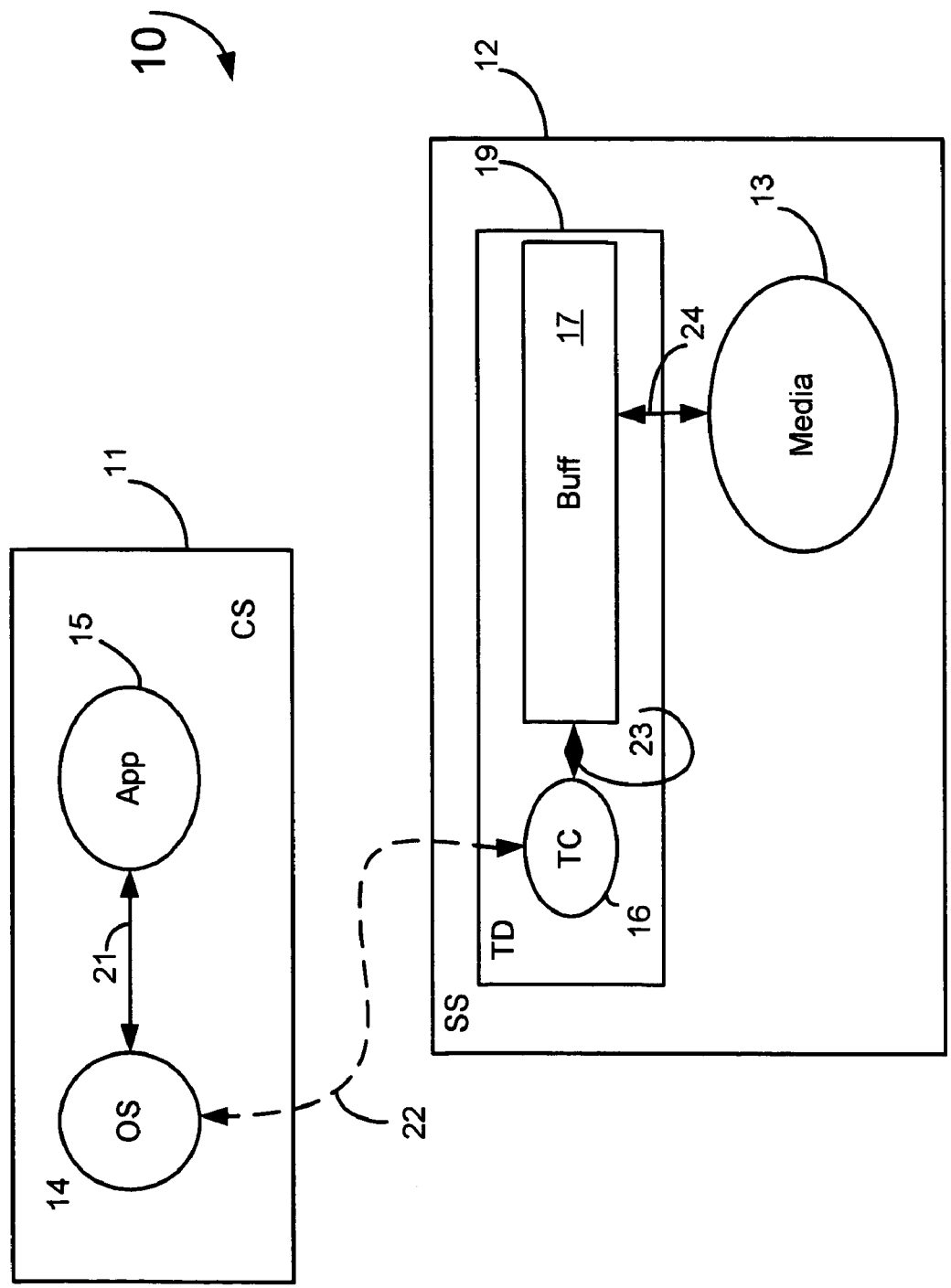
FIG. 1 is a block diagram of a preferred embodiment tape and computer system connected to each other, i.e., a system in which the invention would function.

This invention significantly reduces the time to write modern streaming tapes with a large number of files, providing the increased performance while maintaining ANSI X3.27 labeling compatibility and protection.

We describe an inventive method conforming to ANSI X.3.27 label standards for writing data to a tape after an application program has been assigned to a particular tape, wherein tape marks are synchronized only once per application file. This method uses the operating system to cause the tape drive system to buffer a header tape mark when the operating system is informed that an application program wants to write a file to tape. This buffering instead of writing the tape mark as a synchronizing mark is contrary to the expectation and prior handling of such information by operating systems handling the writing of data files to ANSI X3.27 labeled tapes. The tape drive controller then returns the status of the header tape mark as if it were written instead of buffered. When the application program's data file has all been sent by way of operating system facilitation into the tape drive buffer and the application program is done writing data for this particular data file, it signals the operating system regarding the end of this file. This end of application file signal also requires the writing of an end of file tape mark under the ANSI standard, but in our inventive system, the operating system tells the tape drive system to buffer an end of application file tape mark related to a first file. The ANSI standard then calls for a trailer with trailer information and another tape mark after the trailer. The tape drive system may have started to write the buffered header tape mark, the data of the application program's file, and the end of file tape mark, all of which were buffered, before this point, but it may not have. Under this system, the tape drive controller or subsystem can decide when it is most efficient for it to do so. However, when the operating system signals the tape drive controller to write the synchronizing tape mark, the controller must immediately write all previously buffered information, and then synchronize the particular tape to the tape mark after the ANSI standard trailer to satisfy the functionality available under the ANSI X.3.27 standard.

Under this just described embodiment the tape controller must write its buffer of all file data onto its tape when called upon to write the third tape mark (the synchronizing mark) for an application file. However, we can achieve even greater throughput and efficiency by synchronizing only one time per tape and buffering all the tape marks. In this way the tape drive controller can decide when it has enough data to write instead of having to stop and restart for synchronization each time the tape drive receives a file mark indicating the end of an application file. A secondary buffer may be set up somewhere else within the computer's memory system to hold all the files of data until the synchronization mark is written for this embodiment to assure an acceptable audit trail if there is a bad write in one of the first buffered files since the check on whether it is written right does not occur until near the end of the tape. Such a secondary buffer is outside the scope of this description.

The changes required from a standard operating system to accomplish this enhanced system performance are minor in scope. The driver program for handling ANSI X3.27 tapes merely has to have a way to handle the buffering commands to the tape drive in a way that indicates that the tape marks must be created and buffered instead of created and written, until the synchronization tape mark must be written. The tape drive program for ANSI X3.27 must now recognize when writing the trailer file tape mark that the tape drive must be directed to synchronize the tape. The return of tape drive status signals need not be changed even though the buffered data good status signals don't mean that the buffered data was written to the tape, the data is assumed written unless or until a faulty write signal is returned at the time the synchronization mark is written. The preferred embodiment makes these changes to the OS2200 operating system from Unisys Corporation, the assignee of this patent.

DETAILED DESCRIPTION OF THE PREFERRED EMBODIMENTS

In FIG. 1 a system 10 having a computer system 11 and a tape subsystem 12 are illustrated. An application program 15 communicates 21 through an operating system (OS) 14 via a data path 22 to the tape subsystem 12. A tape drive controller 16 which controls the particular tape drive 19, also controls the flow of data through a buffer 17 into and out from the tape media 13. A physical drive moves the media responsive to the controller's commands. Data pathways 21-24 may include various buffers, buffer pools, busses, crossbars, and so on, as would ordinarily be used in such systems to transfer data signals amongst, between and within the illustrated components. Since the inventive concepts of this patent are applicable primarily to the writing of data onto tapes in accord with the requirements of the ANSI X3.27 standard, we describe the data flow in only one direction. Specifically, the data produced within or by the application 15 is handled by calls the application makes to the operating system 14. The application can be spread amongst various computer systems but the OS 14 typically controls the tape drive functions for a particular computer system. Responsive to the application's request to write to the tape media 13, the OS 14 prepares the appropriate drive signals to send on pathway 22 to the tape controller 16. The data follows on the same pathway. The tape subsystem, if it has received bufferable signals, is left to its own decision as to when to write data to the tape media 13 on pathway 24: If it receives an order to write a synchronizing tape mark, it must write all of the data received to that point before writing the synchronizing tape mark. In modern tape drives, the tape drive can decide what data goes into the tape marks also. This data helps the tape drive deal efficiently with all the other information on the tape in ways the manufacturer of the tape drive has decided are good, however, none of this tape mark data are of relevance to the invention herein. (This after-the-trailer tape mark is not synchronized to if we are using the one-synchronization-per-tape embodiment.)

Figure 2:
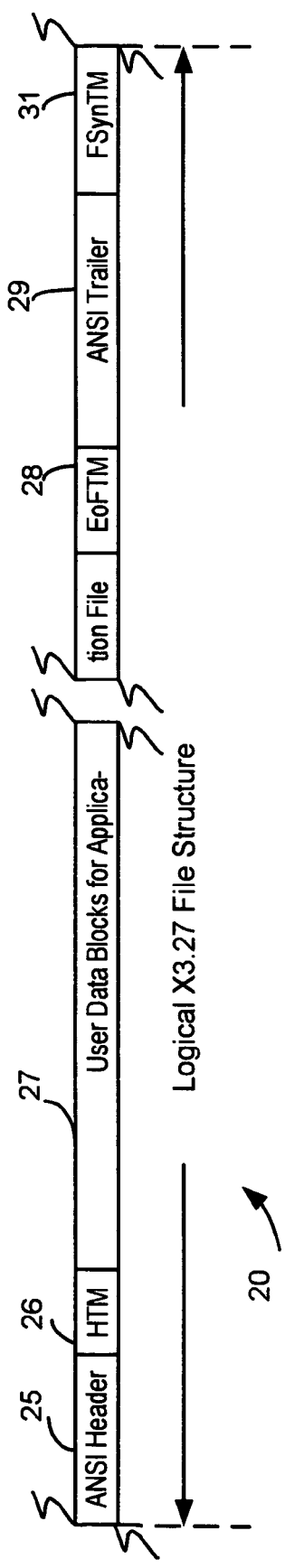
FIG. 2 is a heuristic drawing of a piece of tape media illustrating elements of the ANSI X3.27 standard.

FIG. 2 illustrates the layout of the tape marks 26, 28, and 31 required for an ANSI X3.27 application data file on an ANSI X3.27 labeled tape. The header 25 is written first, then the header tape mark 26. The blocks of data 27 which comprise the file data of the application are written next. They may be of various lengths and information about them may be recorded in the header 25. When the application file is complete the end of file tape mark 28 is written. Then a trailer 29 containing data required to meet the ANSI standard is written and a final synchronizing tape mark 31 is written.

FIGS. 4 through 6 show the basic flow of the system for this invention. The flows assume no tape errors. FIG. 4 shows how synchronize once per logical file operates with labeled tapes. Each of the blocks in these three figures have numbers 1-27 to show correspondence of steps between the figures within the blocks. The blocks are separately numbered 35 to 119 to describe them in detail as separate figures as well. Of greatest significance to this embodiment of the invention are process steps 5, 6, 14, and 15 where the buffered tape marks are written and then process steps 18 and 19 where the last tape mark for the logical file is written and the tape is synchronized.

FIG. 5 illustrates how the inventive process can be used when one synchronizes only once per physical tape operates with labeled tapes. It differs from FIG. 4 only at process steps 18 and 19 which are synchronizing in FIG. 4 but buffered in FIG. 5. Of greatest significance in this embodiment of the invention are process steps 5, 6, 14, 15, 18, and 19 where the buffered tape marks are written and then process steps 23 and 24 where the tape is synchronized.

Finally, FIG. 6 shows how synchronize once per physical tape operates for unlabeled tapes. It differs from FIG. 4 in that process steps 3-6 and 16-19 are removed because they are related to writing the ANSI X3.27 labels. Of significance are process steps 14 and 15 where the buffered tape marks are written and then process steps 23 and 24 where the last tape mark for the tape is written and the tape is synchronized. Thus, the inventive feature of allowing for buffering of synchronization tape marks instead of immediately synchronizing when they are called for may be applicable to tapes, which do not conform to the ANSI X3.27 standard also.

Figure 3:
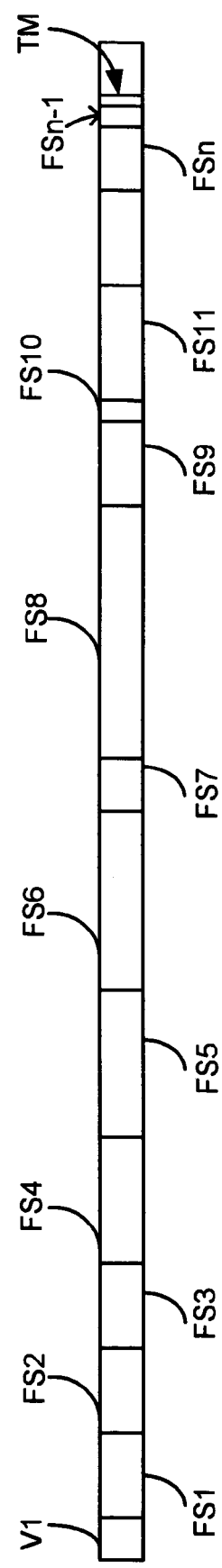
FIG. 3 is another heuristic drawing of a piece of tape media illustrating application files and an end of tape file mark.

For some non-standard users, no final tape mark will be written, and thus the FIG. 3 model of the tape may be missing the end of tape tape mark TMs. For such users, unless they specifically call for it, our invention does not write an end of tape tape mark, assuming they will synchronize, as they may desire.

Thus, all the described embodiments take advantage of the ability to buffer tape marks to significantly reduce the amount of time to write modern streaming tapes with a large number of files.

FIG. 3 illustrates a length of data tape 30 having file segments like that of FIG. 2 (FS1-n), of various sizes, written from the beginning of the tape to the end. Actually, the ANSI X3.27 standard requires the writing of a "volume 1" file V1 at the beginning of the tape and a terminal tape mark (TM) at the end, in addition to the header, trailer and three tape marks for each application file. The terminal tape mark is the synchronization mark used for the alternate embodiments that employ only one synchronizing mark per tape for ANSI X3.27 labeled tapes.

A preferred embodiment inventive process is illustrated in the flow chart 40 of FIG. 4, in which the application is initially assigned 35 to a particular labeled tape for its output when it requests an opportunity to send output to storage. This can be accomplished in various ways not relevant to the invention herein.

The application requests to write the first block of data it wants to write in step 36, sending the request to the OS. The OS then has several things it signals to the tape drive controller. First it tells 37 the tape controller to write an ANSI X3.27 header for the file the application wants to write. Then it receives back 38 a status indicating whether the header has been successfully buffered. The OS then tells 39 the tape drive controller to write a tape mark. What is different here from the previous systems is that here the OS also tells the tape controller it should buffer the tape mark, whereas in all previous ANSI X3.27 compliant systems the tape mark would cause a buffer to flush onto the tape. When the tape drive has buffered the tape mark it returns 41 status to the OS.

Now the OS can send the first block of application data to the tape drive controller and ask it to write or buffer it 42, which the tape controller does, and returns status 43. (Since the controller decides when it will write to the tape except when a synchronization tape mark is ordered by the OS, we shall simply say that the OS tells the controller to buffer, rather than write or buffer for the remainder of this patent document). The OS will return status to the application 44, indicating a successful writing of the first block of data, whether it was written or merely buffered, assuming a successful status was returned at step 43. If 45 there is another data block to be written, the application lets the OS know and asks for it to be written 46, and the OS signals this to the tape controller 47 as before in step 42. This process of steps 46, 47, 43, 44 and 45 recurs until there is no more application data for this file. Then the application will indicate an end of file mark should be written 48.

This will cause several steps 49-57 to execute, involving the components application program, OS, and tape controller. In step 49 the OS will signal the controller to buffer the tape mark for the end of a file. Again, this is something not done previously using ANSI X3.27 standard label tapes, where they required synchronization and flushing and writing of the buffer contents onto the tape every time a tape mark needed to be written. The tape controller will buffer the tape mark and return status 51. The OS, on receiving a good status signal will signal the tape controller to write 52 a trailer meeting the ANSI standard. The tape drive controller will prepare the trailer, buffer or write it and return the status 53. Then the OS will signal the tape drive controller to write the tape mark and synchronize the tape 54. This signal will cause the tape drive controller to dump anything it has in its buffers onto the tape so that it can then write and synchronize to the tape mark, and then it will return a status for this operation 55. The OS will return status 56 to the application program. If 57 the application has more files to write, it will write them by requesting to write the first block of data for the new file by repeating step 36. If not, the application will signal the OS to close the tape 58, and the OS will perform the required protocol for closing the tape, steps 59-64, causing the tape drive to write the end of tape tape mark in step 61, returning status. Assuming the status returned is good, the OS relays it to the application, and the application can proceed to do something else, otherwise it may rewrite the entire tape, call for recovery systems and the like.

FIG. 5 is identical to FIG. 4 except that the synchronization to the tape marks only occurs once at the end of the tape (step 87). Thus steps 82 and 83 are not identical to steps 54 and 55 of FIG. 4 either, since in the embodiment of FIG. 5 (steps 65-91) steps 82 and 83 permit the tape drive controller to buffer the end of ANSI trailer file marks.

FIG. 6, flow chart 60, describes the steps needed if the ideas of this invention are applied to a tape, which does not require synchronized tape marks for anything but the end of a tape. Here the steps of writing the ANSI header and tape mark, and the returned statuses for that are removed, as are the writing of ANSI trailers and extra tape marks at the end of each application data file. The tape mark writing is reduced to once per application data file (and once at the end of a tape if an end of tape tape mark is used). Thus with only nineteen steps (101-119) a tape mark can be written at the end of each application data file and at the end of the tape, and the end of application data file marks can all be buffered, increasing throughput while maintaining these sometimes important tape marks. The advantages of the ANSI X3.27 label are lost with this embodiment however.

Thus, the applicants have described a new method and apparatus for writing data tapes. Accordingly, the invention is limited only by the following appended claims.

What is claimed is:

1. A method for writing data to a tape, comprising:
   causing a tape drive system to store in at least one buffer multiple files that are separated by non-synchronizing tape marks;
   returning status describing the storing of the files;
   after storing of the files is complete, writing the buffered multiple files and the separating non-synchronizing tape marks from the at least one buffer to the tape during a single synchronizing operation; and
   writing a synchronizing end of tape tape mark to the tape.

2. The method of claim 1, and further including providing at least one status describing storing of the files to the at least one buffer.

3. The method of claim 1, and further including:
   storing at least one of a header and a header tape mark to the at least one buffer; and
   writing the at least one of the header and the header tape mark to the tape during the synchronizing operation.

4. The method of claim 3, wherein the files are written to the tape in accordance with American National Standards Institute (ANSI) standard 3.27.

5. The method of claim 1, wherein the storing of the files to the at least one buffer includes storing a respective end of file mark for each of the files.

6. The method of claim 1, and further including assigning an application to the tape.

7. The method of claim 6, wherein one or more of the steps of claim 1 are performed by an operating system upon request by the application.

8. A method for writing data to a tape by an operating system after an application program has been assigned to the tape, the method comprising:
   storing multiple files to a buffer, with non-synchronizing tape marks being stored to separate one file from another;
   following completion of the storing step, writing all of the buffered multiple files and the non-synchronizing tape marks from the buffer to the tape during a single synchronizing operation; and
   writing a synchronizing tape mark to the tape.

9. The method of claim 8, further comprising providing a status for each of the files to describe the storing of the file to the buffer.

10. The method of claim 9, wherein the status is provided to the operating system.

11. The method of claim 8, wherein the files are written from the buffer to the tape upon request by the application program.

12. The method of claim 8, and further including:
    storing at least one of a header and a header tape mark to the buffer; and
    writing the at least one of the header and the header tape mark to the tape during the synchronizing operation.

13. The method of claim 8, wherein the files are written to the tape in accordance with American National Standards Institute (ANSI) standard 3.27.

14. The method of claim 8, wherein the storing step includes storing a respective end of file mark to the buffer for each of the files.

15. A system for storing to a tape data contained in multiple files, comprising:
    means for storing the multiple files to a buffer;
    means for storing non-synchronizing tape marks to the buffer to distinguish one file from another; and
    means for performing a single synchronizing operation to flush all of the files and the non-synchronizing tape marks from the buffer to the tape at once.

16. The system of claim 15, and further including providing status describing the writing of each of the files to the buffer.

17. The system of claim 15, and further including means for storing at least one of a header and a header tape mark to the buffer, and for writing the at least one of the header and the header tape mark from the buffer to the tape during the synchronizing operation.

18. The system of claim 15, and further including means for flushing the files to tape in accordance with American National Standards Institute (ANSI) standard 3.27.

19. The system of claim 15, further including means for buffering a respective end of file mark for each of the files that is buffered, and for flushing each end of file mark to the tape during the synchronizing operation.

20. The system of claim 15, and further including means for assigning an application to the tape, and whereby at least one of the means for storing the files, the means for storing the non-synchronizing tape marks, and the means for performing a single synchronizing operation are activated by requests from the application.

* * * * *